United States Patent [19]

Wiesman

[11] 4,071,491
[45] Jan. 31, 1978

[54] ADHESIVE FORMULATION CONTAINING ISOBUTYLENE RUBBER

[75] Inventor: Dale C. Wiesman, Neenah, Wis.

[73] Assignee: American Can Company, Greenwich, Conn.

[21] Appl. No.: 792,331

[22] Filed: Apr. 29, 1977

[51] Int. Cl.$^2$ ............................................... C08L 9/00
[52] U.S. Cl. ........................... 260/28.5 B; 260/29.7 B; 260/29.7 UA; 260/888; 260/889; 428/484
[58] Field of Search ................. 260/29.7 B, 29.7 UA, 260/28.5 B, 888, 889; 428/484

[56] References Cited

U.S. PATENT DOCUMENTS

| | | | |
|---|---|---|---|
| 3,112,285 | 11/1963 | Phelan et al. | 260/28.5 B |
| 3,265,770 | 8/1966 | Edwards | 260/889 |
| 3,338,905 | 8/1967 | Moyer et al. | 260/889 |
| 3,883,459 | 5/1975 | Kent | 260/28.5 B |
| 3,998,772 | 12/1976 | Beerbower et al. | 260/29.7 B |

*Primary Examiner*—V. P. Hoke
*Attorney, Agent, or Firm*—Robert P. Auber; Ira S. Dorman; George P. Ziehmer

[57] ABSTRACT

An adhesive formulation has a desirable balance of high initial tack, good dry strength, good release, and low tack upon ultimate exposure. It is particularly well suited for securing coupons to carton blanks. The formulation is butyl latex-based and includes a paraffin wax and a lower polyolefin.

7 Claims, No Drawings

ADHESIVE FORMULATION CONTAINING ISOBUTYLENE RUBBER

BACKGROUND OF THE INVENTION

It is common practice to package, within cartons for food products, coupons of various sorts, and this is usually done for promotional purposes. It is desirable to assemble the coupon and the carton at the point of manufacture of the latter, because this saves the step of subsequent insertion of the coupon, which would normally have to be performed by the food packer. To enable assembly at the point of carton production, it is necessary that the coupon be adhered to the carton, and this must be done with a very specialized adhesive.

More particularly, the adhesive must be sufficiently tacky in the wet state to maintain the coupon on the carton at the time of initial assembly, and to withstand relatively high machine speeds; reducing production rates to accommodate coupon attachment is, of course, undesirable. The adhesive must also exhibit sufficient strength in the dry state so that the coupon does not become displaced or detached during subsequent setting-up operations for the carton, and during insertion of the contained product. On the other hand, the material must possess such release properties as will permit the consumer to remove the coupon without damage to it or the carton. Finally, after removal the adhesive should exhibit low levels of tack, so that the consumer can collect a number of coupons in a stack; adhesion under such circumstances would be a source of considerable annoyance.

Adhesives for this purpose have been developed in the past. However, as fas as is known, no such adhesive has heretofore been provided, which affords the desired balance of properties for virtually universal application to conventional carton materials. More particularly, cartons are typically fabricated not only from uncoated paperboard, but also from stock that has been coated in one way or another with such materials as low-density polyethylene, waxes (e.g., blends of paraffin and microcrystalline types), and nitrocellulose varnishes. Hence, the ideal adhesive would be capable of securing a coupon to a carton produced from any of the foregoing types of stock.

One prior art composition formulation is known, which consists of an aqueous dispersion of about 78.5 percent of a butyl rubber (i.e., isobutylene/isoprene copolymer) latex (containing about 63 percent solids), about 1.5 percent of a thickener (containing about 14 percent solids), and about 20 percent of a paraffin wax dispersion (containing about 40 percent solids). While the foregoing formulation is satisfactory for use in connection with uncoated paperboard, adhesion to stock having a surface of polyethylene, varnish or wax is found to be inadequate. Moreover, even as applied to uncoated board, the levels of initial adhesion tend to be somewhat deficient, necessitating a significant reduction in carton making machine speeds.

Accordingly, it is an object of the present invention to provide an adhesive formulation possessing an optimum balance of wet strength, dry strength, release characteristics and freedom from tack in the dry state.

It is also an object of the invention to provide an adhesive having the foregoing balance of properties, and exhibiting them as applied to carton stock having a variety of conventional surface compositions.

Another object is to provide such an adhesive which is of relatively simple composition, and is economical to produce.

SUMMARY OF THE INVENTION

It has now been found that the foregoing and related objects of the invention are readily attained in a novel adhesive formulation comprising an aqueous dispersion of isobutylene rubber, aliphatic hydrocarbon wax having a melting point of at least about 130° Fahrenheit, and a lower polyolefin. The dispersion contains, on a weight basis, about 45 to 55 parts of the rubber, and 5.2 to 2.8 parts of the wax, and about 4.7 to 2.5 parts of the polyolefin, sufficient water being included to provide 100 parts of the formulation. The dispersion will have a viscosity of about 2,500 to 6,000 centipoises.

In preferred embodiments, the formulation will also contain about 0.14 to 0.5 parts by weight of a thickening agent, and normally, it will contain about 35 to 45 parts of weight of water. A particularly preferred formulation includes about 49 parts of the rubber, 4.0 parts of the wax, 3.6 parts of the olefin, and 0.225 parts of thickener, the viscosity of the dispersion being in the range of about 3,000 to 4,000 centipoises. The rubber utilized will most advantageously be a copolymer of about 97 weight percent isobutylene and about 3 weight percent of isoprene, the polyolefin will most advantageously be polyethylene, and the wax will most advantageously be a paraffin. Finally, the rubber will desirably have an average particle size of about 0.3 micron, with about 95 percent of the particles thereof falling within the range of 0.1 the 0.8 micron.

DETAILED DESCRIPTION OF THE PREFERRED EMBODIMENT

Exemplary of the efficacy of the present invention is the following example, wherein all parts specified are on a weight basis:

EXAMPLE I

An adhesive formulation embodying the present invention, and hereinafter referred to as "Formulation A," was prepared by admixing 78.5 parts of a rubber latex, 1.5 parts of a thickener, 10 parts of a wax dispersion, 10 parts of a polyethylene dispersion, and about 0.2 part of a defoaming agent. The rubber employed was a product which is commercially available from the Exon Corporation under the designation "Butyl Latex 100". It is described as an anionic emulsion of butyl rubber plus 400 parts per million of formaldehyde, added as a preservative; the rubber is a copolymer of isobutylene (about 97 weight percent) and isoprene (about 3 weight percent). The latex contains 61 to 65 percent solids, has a specific gravity of 0.95, a density of about 8 pounds per gallon, and a pH of 4.5 to 6.5. The average particle size of the rubber is 0.3 micron, with 95 percent of the particles falling within the range of 0.1 to 0.8 micron. The latex exhibits a Brookfield viscosity of 2,000 centipoises at 12 rpm, utilizing an LVT No. 3 spindle.

The thickener employed is commercially available from the Borden Chemical Company under the designation "Polyco 296W", and is a 15 percent solids dispersion of sodium polyacrylate in water. It has a specific gravity of 1.07, a density of 8.9 pounds per gallon, a pH of 9 to 11, and a viscosity of 20,000 to 35,000 centipoises at 12 rpm utilizing an LVF No. 4 spindle.

A product sold by Quaker Chemical Corporation under the designation "Velvetol 77-70" was employed as the wax component. The product is a 40 percent solids, nonionic aqueous dispersion of a paraffin wax having a melting point of 130° Fahrenheit; its pH is about 7 and its density is about 8.3 pounds per gallon. A second product, also furnished by Quaker Chemical Corporation, was employed as the polyethylene ingredient; it is available under the designation "Velvetol 77-18", and is a 36 percent solids, non-ionic aqueous dispersion of low density polyethylene; its pH is about 9.5, and its density about 8.25 pounds per gallon.

The defoamer used is sold by the Diamond Shamrock Corporation under the designation "Foamaster VF". It is a 100 percent active, nonionic water-dispersable material having a density of about 7.8 pounds per gallon.

A second formulation was prepared with the same ingredients and the same proportions described for Formulation A, with the sole exception that 20 parts of the wax dispersion was used, and the polyethylene was excluded. This formulation is hereinafter referred to as "Formulation B," and is a prior art composition, which does not embody the instant invention.

Quantities of both of the foregoing formulations were applied to substrates having surfaces of various types, by utilizing a rubber pad having a surface area of about 5/16 square inch; in each instance four dots were applied, the weight of each being about 0.14 gram, in the wet state. A parchment paper coupon, measuring about 6 inches by 2½ inches, was applied to each of the surfaces so prepared, with sufficient pressure only to ensure complete contact. The samples were then permitted to age for three days under ambient conditions.

Following aging, the strength of the bond between the coupon and the substrate of each sample was tested in the following manner: The sample was first cut into quarters, with each part having a section of the coupon adhered to a section of the substrate by a single dot. The free end of the coupon section was clamped to a strain gauge mounted above a freely rotatable wheel, which had a diameter of about 2½ inches, and which was, in turn, mounted for withdrawal, at a variable but constant speed, from the strain gauge. The substrate portion was then held against the surface of the wheel, with an angle of about 90° between the substrate and the coupon sections. The wheel was then withdrawn at a rate of about 10 inches per minute, and the maximum reading registered on the strain gauge was noted.

In Table I, set forth below, the average strength of the various samples tested is indicated, the strength being stated in ounces.

TABLE I

| Surface | Formulation A | Formulation B |
|---|---|---|
| Uncoated paperboard | 7.2 | 6.7 |
| Paraffin/microcrystalline wax blend on paperboard | 3.2 | 1.6 |
| Low density polyethylene on paperboard | 5.0 | 1.0 |
| Low density polyethylene sheet | 6.9 | 0.9 |
| Nitrocellulose varnish on paperboard | 5.7 | 1.5 |

From the foregoing, it can be readily seen that the composition containing the polyethylene (Formulation A) was superior to the composition from which it was omitted (Formulation B), regardless of the surface composition of the substrate involved (although with the uncoated paperboard the results were virtually the same). Moreover, it has been observed in machine trials that Formulation A resulted in sufficient adhesion, in the wet state, that operations could be carried out at virtually full speed. Formulation B, on the other hand, necessitated some speed reduction, so as to avoid detachment of an excessive number of the coupons, and this was so even though each formulation had a viscosity of about 3,000 (measured with a Brookfield viscometer at 20 rpm under ambient conditions). In all instances release was good, with no damage to either the coupon or the substrate. The coupon surface was non-blocking, and substantially free from tacky residue.

While it might be thought that adhesion to a polyethylene surface could be improved by the inclusion of polyethylene in the formulation, it should be recognized that application occurs in the cold state. That is, since there is no fusion of the polyethylene, and hence no migration across the interface, there is no reason to expect that the improved result would be realized. Certainly, there is no reason to expect that polyethylene would improve adhesion to surfaces such as wax and nitrocellulose.

The rubber of the formulation may have some variation in composition. However, it should be essentially isobutylene, preferably containing a small amount of isoprene copolymerized therewith. To insure that the particle size of the rubber is satisfactory, it should be added to the formulation as a latex.

Generally, any hard, aliphatic wax having a melting point of at least about 130° Fahrenheit will function adequately in the present formulations, it being important that the wax not exhibit excessive tack under operating conditions. Normally, the wax will be a paraffin, but it is possible that other types (e.g. microcrystalline) may be used alone or in combination therewith.

While lower polyolefins (i.e., those containing 2 to 4 carbon atoms) other than polyethylene may be suitable for use, it is believed that the most satisfactory results will be achieved with that resin, and particularly the low density form thereof. Generally, it will be convenient to add the wax and the polyethylene as separate dispersions, but an admixture of both ingredients may also be employed, if so desired.

Although a thickening agent will usually be included, if the viscosity of the other components is sufficient, that ingredient can be omitted. Moreover, virtually any conventional thickener that is compatible with the system may be used, the one specified being for illustrative purposes only. Finally, it should be appreciated that the formulation may contain components other than those herein specified, as will be evident to those skilled in the art. For example, defoamers conventionally used for aqueous systems may be added to facilitate handling and application of the adhesive.

Thus, it can be seen that the present invention provides an adhesive formulation possessing an optimum balance of wet strength, dry strength, and release characteristics, while producing no blocking or tacky residue. The adhesive exhibits the foregoing properties as applied to carton stock having a variety of conventional surface compositions, and it is of relatively simple composition and economical to produce.

Having thus described the invention, what is claimed is:

1. As an adhesive formulation, an aqueous dispersion comprising, on a weight basis, about 45 to 55 parts of an isobutylene rubber, about 5.2 to 2.8 parts of an aliphatic hydrocarbon wax having a melting point of at least about 130° Fahrenheit, about 4.7 to 2.5 parts of a lower polyolefin, and water in an amount sufficient to provide 100 parts of said formulation, said dispersion having a viscosity of about 2,500 to 6,000 centipoises.

2. The formulation of claim 1 additionally including in said dispersion about 0.14 to 0.5 parts by weight of a thickening agent.

3. The formulation of claim 2 wherein the amount of water is from about 35 to 45 parts by weight.

4. The formulation of claim 2 containing about 49 parts of said rubber, about 4.0 parts of said wax, about 3.6 parts of said polyolefin and about 0.225 parts of said thickening agent, said dispersion having a viscosity of about 3,000 to 4,000 centipoises.

5. The formulation of claim 1 wherein said rubber is a copolymer of about 97 weight percent of isobutylene and about 3 weight percent of isobutylene and about 3 weight percent of isoprene, and wherein said polyolefin is polyethylene.

6. The formulation of claim 5 wherein said rubber has an average particle size of about 0.3 micron, with at least 95 percent of said particles falling within the range of 0.1 to 0.8 micron.

7. The formulation of claim 5 wherein said wax is a paraffin.

* * * * *